United States Patent
Okano et al.

(10) Patent No.: US 6,909,489 B1
(45) Date of Patent: Jun. 21, 2005

(54) LUMINOUS SOURCE APPARATUS, IMAGE PROJECTING APPARATUS AND IMAGE PROJECTION CONVERTING APPARATUS

(75) Inventors: Tadashi Okano, Kanagawa (JP); Kunika Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/626,458

(22) Filed: Jul. 23, 2003

Related U.S. Application Data

(63) Continuation of application No. 10/161,024, filed on Jun. 3, 2002, now abandoned, which is a continuation of application No. 09/266,077, filed on Mar. 10, 1999, now abandoned.

(30) Foreign Application Priority Data

Mar. 12, 1998 (JP) .......................................... 10-061495

(51) Int. Cl.[7] ........................ G03B 19/18; G03B 21/00; G03B 27/72; G03B 27/74
(52) U.S. Cl. .......................... 352/198; 352/45; 355/35; 355/68
(58) Field of Search ...................... 355/35, 68; 352/45, 352/198

(56) References Cited

U.S. PATENT DOCUMENTS

| | | | |
|---|---|---|---|
| 3,521,952 A | 7/1970 | Nelson et al. | 355/38 |
| 3,698,809 A | 10/1972 | Harter et al. | 355/68 |
| 3,817,617 A | 6/1974 | Weinert | 355/51 |
| 4,076,414 A | 2/1978 | Tulbert | 355/38 |
| 4,110,039 A | 8/1978 | Roder | 355/68 |
| 4,408,838 A | 10/1983 | Factor | 350/347 |
| 4,792,829 A | 12/1988 | Firmani | 355/38 |
| 4,816,874 A | 3/1989 | Terashita et al. | 388/38 |
| 5,063,407 A | 11/1991 | Takagi | 355/68 |
| 5,100,805 A | * 3/1992 | Ziege et al. | 436/517 |
| 5,136,397 A | 8/1992 | Miyashita | 358/236 |
| 5,162,841 A | 11/1992 | Terashita | 355/38 |
| 5,369,463 A | 11/1994 | Terashita et al. | 355/38 |
| 5,528,288 A | 6/1996 | Sandor et al. | 348/97 |
| 5,555,073 A | 9/1996 | Grossman et al. | 355/41 |
| 5,986,741 A | 11/1999 | Kimura | 355/38 |

OTHER PUBLICATIONS

Oriel Instruments: Online catalog, 68950 Light Intensity Control System, www.lotoriel.co.uk, 2004.*

* cited by examiner

*Primary Examiner*—Rodney Fuller
(74) *Attorney, Agent, or Firm*—Frommer Lawrence & Haug LLP; William S. Frommer

(57) ABSTRACT

A luminous source apparatus, an image projecting apparatus, and an image projection converting apparatus to prevent a projected image, or an electronic image obtained through electronization of the projected image from intensity variations. A photosensor detects the light-emission quantity from a light-emission lamp in order to regulate the current supplied with the light-emission lamp according to a light-quantity detecting signal from the photosensor, so as to make the light-emission quantity from the light-emission lamp constant. Projected light-quantity onto a movie film is regulated and an image obtained from a shooting section becomes an image having a good quality with a little flicker.

18 Claims, 9 Drawing Sheets

LUMINOUS SOURCE APPARATUS, IMAGE PROJECTING APPARATUS AND IMAGE PROJECTION CONVERTING APPARATUS

CROSS REFERENCE TO RELATED APPLICATIONS

This is a continuation of U.S. patent application Ser. No. 10/161,024, filed Jun. 3, 2002, now abandoned which is a continuation of application Ser. No. 09/266,077, filed Mar. 10, 1999 now abandoned.

BACKGROUND OF THE INVENTION

1. Field of the Invention

The present invention relates to an image projecting apparatus, projecting an image by projecting light onto a recording medium in which the image is recorded, and a luminous apparatus used for the image projecting apparatus, and an image projection converting apparatus, converting the image, projected by projecting light onto the recording medium in which the image is recorded, into an electronic image.

2. Description of the Related Art

An image projection converting apparatus called telecinematography apparatus which converts a movie film in which an image is recorded into a video image is known. Generally the telecinematography apparatus transports a movie film intermittently and projects an image by projecting light onto each of frame images, while performing electronization of the projected image with an image pickup device to convert it into video signals.

According to such image projection converting apparatus, as a wide bandwidth including three colors R(red), G(green), B(blue) and a sufficient light-emission quantity are required for a luminous source, emitting light to be projected onto the movie film, a luminous source such as a xenon lamp, for example, is widely used.

However, in such luminous source, inert gases sealed in a housing produce convection by heat-producing, causing light-quantity variation called flicker. Therefore, the level of light projected onto the movie film varies, resulting in frame-by-frame variation of the intensity level of the projected and picked-up electronic image, i.e. a problem of deterioration of the quality of the obtained image.

The problem does not only relate to an image converting apparatus such as the telecinematography apparatus, but also to a typical projector used in a cinema theater, for example, or to a liquid crystal image projecting apparatus, configured to project an image formed by a liquid-crystal display device onto a screen.

It is an object of the invention to provide a luminous source apparatus, an image projecting apparatus, and an image projection converting apparatus for suppressing harmful intensity variation of a projected image.

A luminous source apparatus of the invention, being used in an image projecting apparatus, which performs image projection by projecting light onto a recording medium in which an image is recorded, comprises: a luminous body emitting light to be projected onto the recording medium; means for detecting the light-quantity emitted from the luminous body; and means for regulating the light-quantity emitted from the luminous body based on the result of the detection by the means for detecting the light-quantity, so as to make the light-quantity projected onto the recording medium constant. A recording medium may be implemented with a movie film, or a group of liquid-crystal display device, for example.

An image projecting apparatus of the invention, performing image projection by projecting light onto a recording medium in which an image is recorded, comprises: a luminous body emitting light to be projected onto the recording medium; means for detecting the light-quantity emitted from the luminous body; and means for regulating the light-quantity emitted from the luminous body based on the result of the detection by the means for detecting the light-quantity, so as to make the light-quantity projected onto the recording medium constant.

Another image projecting apparatus of the invention, performing image projection by projecting light onto a recording medium in which an image is recorded, comprises: a luminous body emitting light to be projected onto the recording medium; means for detecting the light-quantity emitted from the luminous body; means for closing and opening the light-path from the luminous body to the recording medium; and means for controlling the opening/closing operation of the means for opening/closing light-path based on the result of the detection by the means for detecting the light-quantity, in order to make the accumulated light-quantity projected onto the recording medium constant. The means for controlling opening/closing light-path may be configured to begin the accumulation of the light-quantity detected by the means for detecting the light-quantity at the point of making the means for opening/closing light-path in opened state, and to make the means for opening/closing light-path in closed state at the point of the accumulated light-quantity reaching to prescribed value. Or the means for controlling opening/closing light-path may also be configured to accumulate the light-quantity detected by the means for detecting the light-quantity for a given period before making the means for opening/closing light-path be in opened state, while obtaining the opening period of the light-path of the means for opening/closing light-path based on the accumulated value, and to make the means for opening/closing light-path be in opened state for the obtained opening period of the light-path. The means for opening/closing light-path may be implemented with a liquid-crystal shutter.

An image projection converting apparatus of the invention, performing image projection by projecting light onto a recording medium in which an image is recorded and converting the projected image into an electronic image, comprises: a luminous body emitting light to be projected onto the recording medium; means for detecting the light-quantity emitted from the luminous body; means for picking-up image projected by projectinglight from the luminous body; and means for regulating intensity level of the image signal obtained through the means for picking-up image, based on the result of the detection of the means for detecting the light-quantity.

According to the luminous source apparatus or the image projecting apparatus of the invention, the light-emission quantity of a luminous body is detected by the means for detecting the light-quantity, and the light-emission quantity of the luminous body is regulated based on the result of the detection. Hereby, the light-quantity projected onto a recording medium is regulated to be constant, resulting in reducing the harmful intensity variation of an image projected by light.

According to another image projecting apparatus of the invention, the light-emission quantity of a luminous body is detected by the means for detecting the light-quantity, and the light-path from the luminous body to the recording medium is closed and opened, based on the result of the detection. Hereby, the accumulated projected light-quantity is regulated to be constant, resulting in avoiding the intensity variation of the projected image caused by the light-quantity variation of the luminous body.

According to the image projection converting apparatus of the invention, the light-emission quantity of a luminous body is detected by the means for detecting the light-quantity, and the intensity level of the image signal obtained by the means for picking-up image, which picks up the image projected by projecting-light of the luminous body, is regulated, based on the result of the detection. Hereby, the intensity variation of the picked-up image signal caused by the light-quantity variation of the luminous body will be avoided.

Other and further objects, features and advantages of the invention will appear more fully from the following description.

DETAILED DESCRIPTION OF THE PREFERRED EMBODIMENTS

The embodiments of the invention will now be described in detail making reference to the accompanying drawings.

Figure 1:
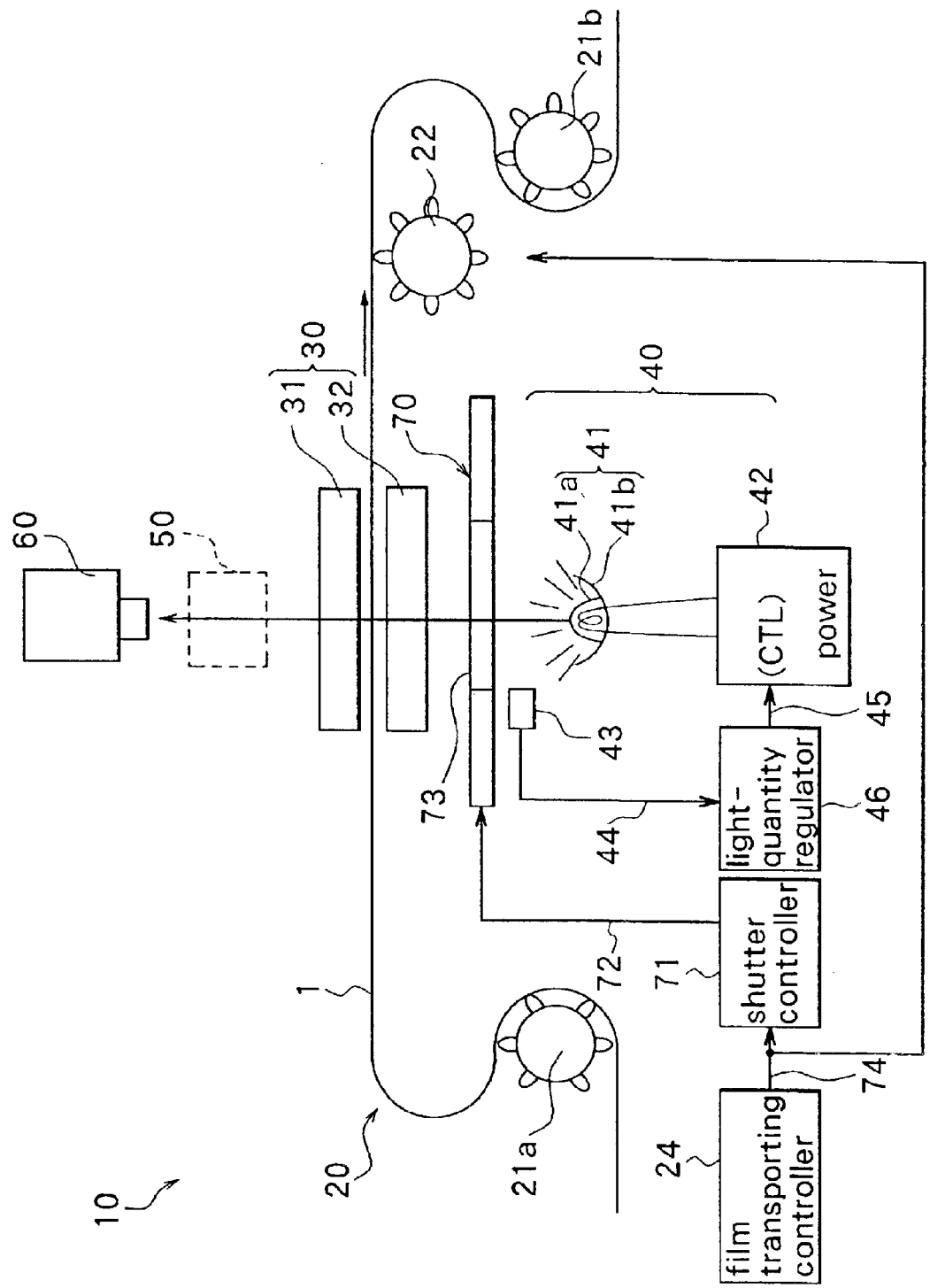
FIG. 1 is an illustration showing a diagrammatic configuration of an image projection converting apparatus as an image projecting apparatus including the luminous source apparatus related to the first embodiment of the invention.

FIG. 1 shows a diagrammatic configuration of the image projecting apparatus configured with the luminous source apparatus related to the first embodiment of the invention. An image projecting apparatus referred to the embodiment is an image projection converting apparatus having a shooter which is able to convert a projected image into an electronic image signal (video signal), and is called telecinematography apparatus.

The image projection converting apparatus 10 includes: a transporting mechanism 20 as to intermittently transport movie film 1, in which a series of frame images is recorded at constant intervals; gate section 30 consists of movable picture gate 31 and immovable picture gate 32, arranged below the movable picture gate 31 so as to put the movie film 1 transported by the transporting mechanism 20 in between; the luminous source apparatus 40 so as to project light onto the movie film 1 pausing at a prescribed position of the gate section 30. The movable picture gate 31 is able to move up and down when the movie film 1 is loaded. Openings(not shown in figures) are formed at each gate of the gate section 30, so as to guide the light from the luminous source apparatus 40 to a prescribed area of the movie film 1. The gate section 30 also includes a film position detector(not shown in figures) so as to detect the pausing position of the movie film 1.

The image projection converting apparatus 10 also includes: optical-axis correction/projection-lens section 50 having an optical-axis correction mechanism(not shown in figures) performing optical-axis correction according to the position of the movie film 1 detected from the above-mentioned film position detector of the gate section 30, and a projection lens(not shown in figures) performing condensation of the projected light passed through the gate section 30; shooter 60 constructed of such as a TV camera with an image pickup device such as CCD(charge-coupled device) and which performs electronization of the recorded information of the movie film 1, by shooting the projected image of the movie film 1, projected by the light from the luminous source apparatus 40; and shutter mechanism 70 located between the luminous source apparatus 40 and the gate section 30, which interrupts or allows the light from the luminous source apparatus 40 to reach the movie film 1.

The transporting mechanism 20 is configured with continuously-transporting sprockets 21a, 21b which rotate continuously, and intermittently-transporting sprocket 22 which-rotates intermittently. The continuously-transporting sprockets 21a, 21b transport the movie film 1 continuously, while intermittently-transporting sprocket 22 transports the movie film 1 intermittently in a prescribed interval near the gate section 30, according to film driving signal 74 from film transporting controller 24.

The luminous source apparatus 40 includes: light-emission section 41 configured with light-emission lamp 41a such as xenon lamp and reflector 41b; power supply 42 supplying a current to the light-emission lamp 41a; photosensor 43 detecting the light-emission quantity of the light-emission lamp 41a; light-quantity regulator 46 outputting light-quantity regulating signal 46 to regulate the light-emission quantity of the light-emission lamp 41a so as to be constant, based on light-quantity detecting signal 44 outputted from the photosensor 43. The power supply 42 includes a control terminal(CTL), to which the light-quantity regulating signal 45 from the light-quantity regulator 46 is inputted, and which controls a current supplied to the light-emission lamp 41a according to the light-quantity regulating signal 45. The luminous source apparatus 40 corresponds to one example of the luminous source apparatus related to the invention, the light-emission lamp 41a corresponds to one example of 'the luminous body' of the invention, the photosensor 43 corresponds to one example of 'the means for detecting the light-quantity' of the invention, and the light-quantity regulator 45 corresponds to one example of 'the means for regulating the light-quantity' of the invention.

Shutter 73 included in shutter mechanism 70 consists of such as a liquid-crystal shutter, and performs opening/closing operation according to shutter opening/closing signal 72 from shutter controller 71. The shutter controller 71 operates in synchronization with the film transporting controller 24.

According to telecinematography apparatus 10 having such configuration, the movie film 1 is transported intermittently by each frame by transporting mechanism 20, and is projected by light from the luminous source apparatus 40, when the film position detector of the gate section 30 detects each frame image of movie film 1 pausing at prescribed position of the gate section 30. To be more specific, the shutter 73 of the shutter mechanism 70 repeats opening and closing in synchronization with intermittently-transporting operation of the movie film 1, performed by intermittently-transporting sprocket 22, in accordance with film 1, driving signal 74 from the film transporting controller 24, and light from the luminous source apparatus 40 is projected onto the movie film 1 passing through the opened shutter 73 of the shutter mechanism 70, only when the movie film 1 is in pause state. Hereby, an image recorded in the movie film 1 is projected onto the shooter 60 through the optical-axis correction/projection-lens section 50. Besides, an exposure time of the movie film 1 is prescribed by the shutter mechanism 70, in order to avoid shifts of image positions, which may occur when the intermittent transportation of the movie film 1 is set to pickup-image timing.

Figure 2:
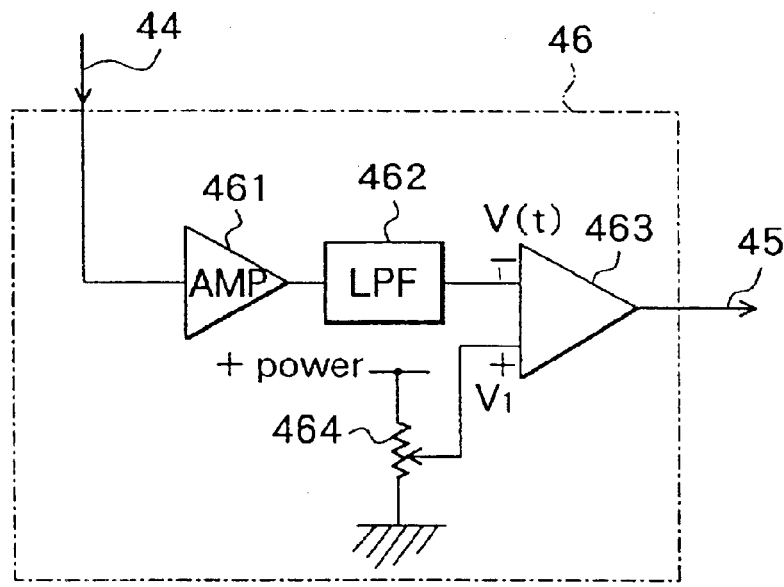
FIG. 2 is a block diagram showing the configuration of the light-quantity regulator shown in FIG. 1.

FIG. 2 shows a diagrammatic configuration of the light-quantity regulator 46 shown in FIG. 1. As is shown in the figure, the light-quantity regulator 46 includes: amplifier (AMP) 461 to which the light-quantity detecting signal 44 from the photosensor 43 is inputted; low-pass filter(LPF) 462 connected to the output terminal of the amplifier 461 so as to cut a high-frequency component and only to let a low-frequency component pass through; differential amplifier 463 outputting the light-quantity regulating signal 45 and supplying it to the control terminal of the power supply 42. The minus terminal of the differential amplifier 463 is connected to the output terminal of the low-pass filter 462, and the plus terminal is connected to the movable terminal of potentiometer 464, one end of which is connected to a power supply voltage (+), and another end of which is grounded.

According to the light-quantity regulator 46 having such configuration, the inputted light-quantity detecting signal 44 is amplified in the amplifier, smoothed in the low-pass filter 462, and inputted to the minus terminal of the differential amplifier 463 as detected light-quantity voltage V(t). On the other hand, reference light-quantity voltage V1 set up by the potentiometer 464 is inputted to the plus terminal of the differential amplifier 463. And the differential amplifier 463 outputs the difference between the reference light-quantity voltage V1 and the detected light-quantity voltage V(t), i.e. [V1−V(t)], as the light-quantity regulating signal 45. The V1 is a selected fixed voltage value, while the V(t) is a voltage value which varies accompanying with time (t).

Next, the operation and the effect of the image projection converting apparatus 10 configured as mentioned above will now be described.

Figure 3:
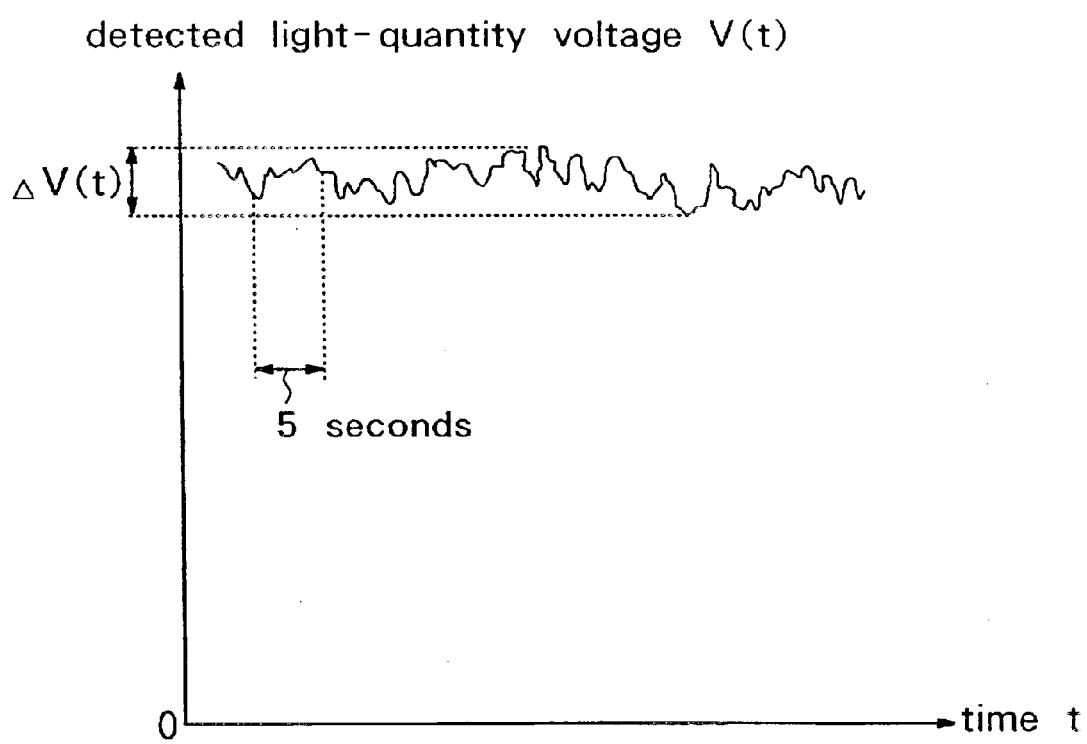
FIG. 3 is an illustration showing the variation condition of the light-quantity detecting signal outputted from the photosensor of the luminous source apparatus.

FIG. 3 shows the variation of the light-quantity detecting signal 44(namely the light-quantity variation of the light-emission lamp 41a of the luminous apparatus 40) outputted from the photosensor 43. The vertical axis in the figure shows the detected light-quantity voltage V(t), while the horizontal axis shows time. As is shown in the figure, the light-quantity of the light-emission lamp 41a varies enormously in a period of 0.5 to 5 seconds, and the variation quantity ΔV(t) reaches to about 2~3%. Therefore, when an image is projected by projecting light which includes such variation, onto the movie film 1, a video image obtained through shooter 60 falls in including intensity variation (flicker) resulting in the deterioration of image quality. According to the embodiment, as is described above, the light-emission quantity of the light-emission lamp 41a is detected, and a current supplied from the power supply 42 to the light-emission lamp 41a is regulated according to the detected light-quantity so as to make the light-emission quantity of the light-emission lamp 41a constant. The detailed operation will be described in the following.

First, the whole operation of the image projection converting apparatus 10 will be described. The intermittently-transporting sprocket 22 of the transporting mechanism 20 intermittently transports the movie film 1 by rotating according to the film driving signal 74 from the film transporting controller 24. The shutter 73 of the shutter mechanism 70 is maintained in closed state, while the movie film 1 is transported. When it is detected by the film position detector (not shown in figures) of gate section 30 that each image frame of the movie film 1 paused at the prescribed position of the gate section 30, the shutter 73 of the shutter mechanism 70 is opened following the shutter opening/closing signal 72 from the shutter controller 71, and light from the light-emission lamp 41a of the luminous source apparatus 40 is projected onto the movie film 1 passing through the shutter 73 of the shutter mechanism 70. Hereby, the image recorded in the movie film 1 is projected, and it reaches to the shooter 60 through optical-axis correction and light-gathering by the optical-axis correction/projection-lens section 50. The projected image received by an image pickup device not shown in figures, converted photoelectrically, and recorded in electronic-image recording medium such as a video tape as an electronic image signal(video signal), after passing through various kinds of signal processing circuits. Besides, according to the embodiment, the opening period of the shutter 73 of the shutter mechanism 70 is a fixed period prescribed in advance.

Next, the characteristic operation of the image projection converting apparatus 10 will be described. The light-emission lamp 41a emits light with intensity according to the magnitude of the current supplied from the power supply 42. The photosensor 43 receives the light from the light-emission lamp 41a, outputs a voltage signal according to the light-quantity as the light-quantity detecting signal 44, and inputs it to the light-quantity regulator 46. The light-quantity regulator 46 amplifies the light-quantity detecting signal 44 at the amplifier 461, smoothes the amplified signal by rejecting a high frequency component at the low-pass filter 462, and inputs the filtered signal to the minus terminal of the differential amplifier 463 as the detected light-quantity voltage V(t). The differential amplifier 463 takes the difference between the reference light-quantity voltage V1 and the detected light-quantity voltage V(t), i.e. [V1−V(t)], and outputs it as the light-quantity regulating signal 45, supplying it to the control terminal(CTL) of the power supply 42.

The power supply 42 varies the magnitude of the current provided to the light-emission lamp 41a in a manner to make the level of the inputted light-quantity regulating signal 45 approach zero. To be more specific, when the level of the light-quantity regulating signal 45 is positive, namely when V1>V(t), a current supplied to the light-emission lamp 41a is increased by amount according to the absolute value of the difference [V1−V(t)], and when the light-quantity regulating signal 45 is negative, namely when V1<V(t), a current provided to the light-emission lamp 41a is decreased by amount according to the absolute value of the difference

[V1−V(t)]. The light-emission quantity of the light-emission lamp 41a of the luminous source apparatus 40 is regulated to be constant, by performing such control in a prescribed cycle(for example, a few milliseconds cycle). Such light without light-quantity variation like this is projected onto the movie film 1 performing image projection, resulting in obtaining a video signal without flicker by the shooter 60.

According to the embodiment of the image projection converting apparatus 10, the photosensor 43 detecting the light-emission quantity of the light-emission lamp 41a is provided, and the current provided from the power supply 42 to the light-emission lamp 41a according to the light-quantity detecting signal 44 from the photosensor 43 is regulated so as to make the light-emission quantity of the light-emission lamp 41a constant. Therefore, the image obtained by the shooter 60 becomes an image with good quality with a little flicker(intensity variation). And also makes it possible to compensate the light-quantity reduction of the light-emission lamp 41a caused through secular changes.

Next, the second embodiment of the invention will now be described.

Figure 4:
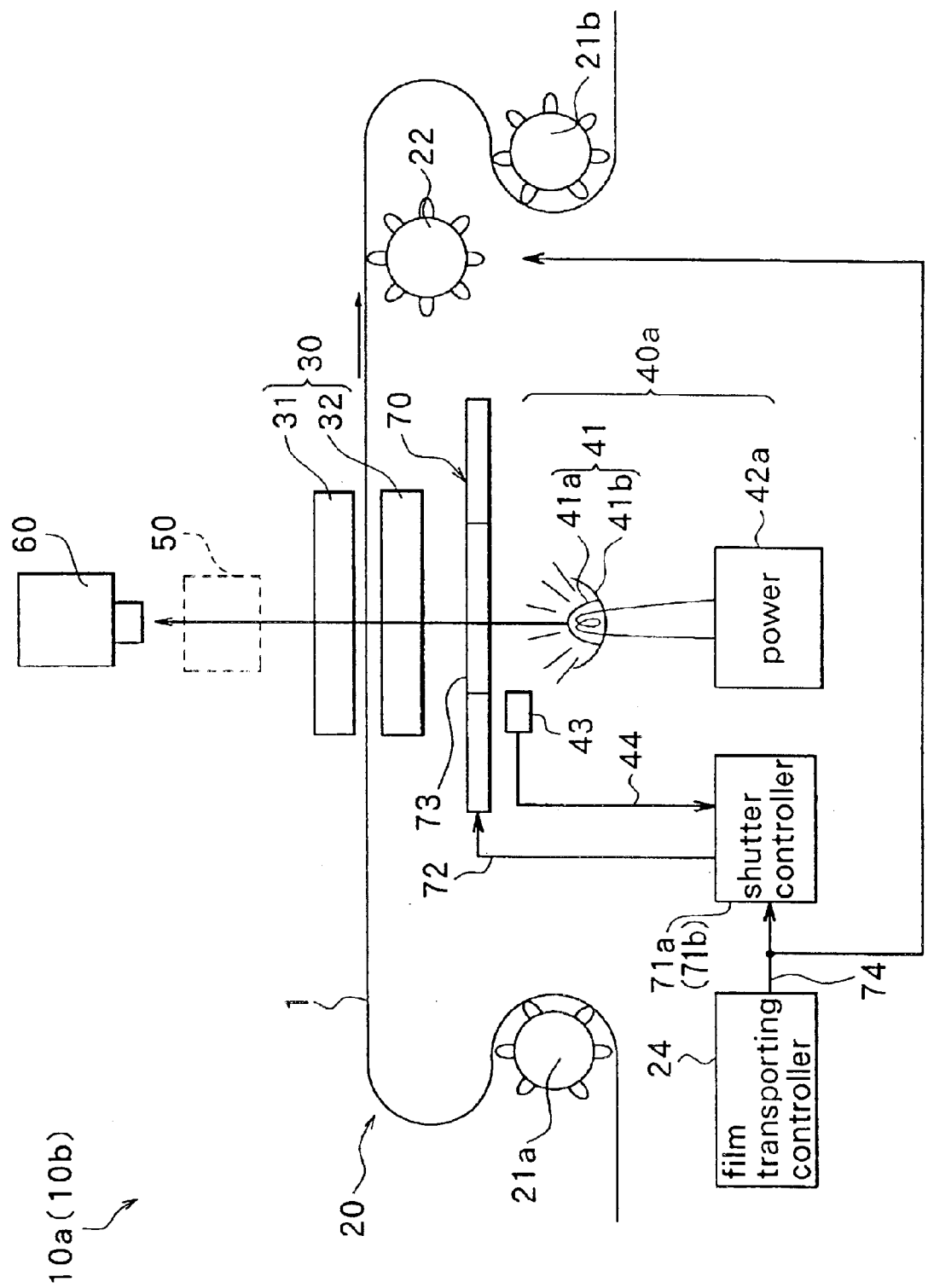
FIG. 4 is an illustration showing a diagrammatic configuration of an image projection converting apparatus as an image projecting apparatus related to the second embodiment of the invention.

FIG. 4 shows a diagrammatic configuration of an image projection converting apparatus as an image projecting apparatus related to the second embodiment of the invention. In the figure, the same marks as the one used in the above-mentioned first embodiment(FIG.1) represent the same configuration elements, and explanation will be omitted suitably.

According to image projection converting apparatus 10a of the embodiment, the light-quantity detecting signal 44 from the photosensor 43 is inputted to shutter controller 71a. The light-quantity regulator 46 is not provided, and a control terminal is not included in power supply 42a. As will be described, the shutter controller 71a of the embodiment performs control as follows. The shutter controller 71a opens the shutter 73 of the shutter mechanism 70 under control of shutter opening/closing signal 72, according to the film driving signal 74 from the film transporting controller 24. At the same time, the shutter controller 71a begins to integrate the light-quantity detecting signal 44 from the photosensor 43. And the shutter controller 71a closes the shutter 73 of the shutter mechanism 70 when the obtained integral L(t) of light-quantity has reached to a prescribed reference integral L1. Other configurations are as same. as the above-mentioned first embodiment. The shutter mechanism 70 corresponds to one example of 'the means for opening/closing light-path', and the shutter controller 71a corresponds to one example of the 'means for controlling opening/closing light-path'.

Figure 5:
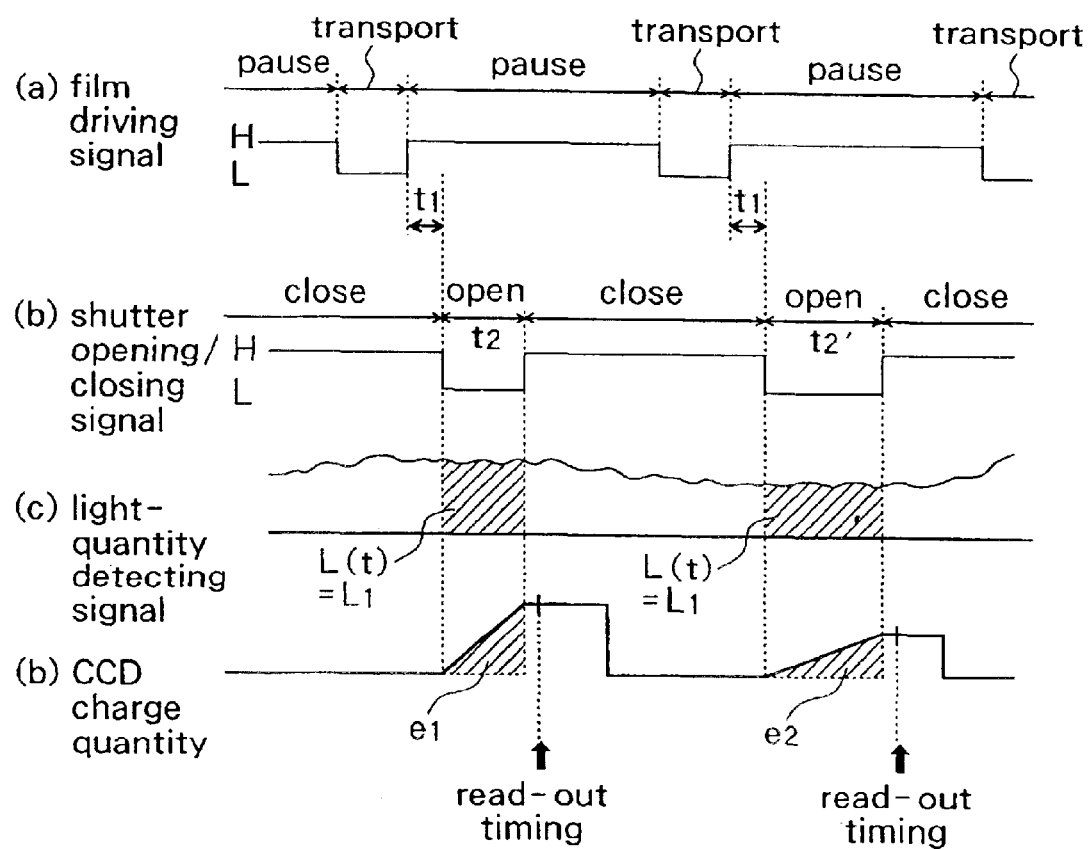
FIG. 5 is an illustration showing the operation timing of the image projection converting apparatus shown in FIG.4.

Next, the operation and the effect of the image projection converting apparatus 10a having such configuration will now be described making reference to FIG. 5 and FIG. 6. FIG. 5 shows the operation timing of the image projection converting apparatus 10a. The film driving signal 74 is shown as (a) in the figure, and "H" level zone indicates the pausing state of the movie film 1, while "L" level zone indicates the transporting state. The shutter opening/closing signal 72 is shown as (b) in the same figure, and "H" level zone indicates the closing state of the shutter 73 of the shutter mechanism 70, while "L" level zone indicates the opening state. The variation of the light-quantity detecting signal 44 is shown as (c) in the same figure, while (d) in the same figure shows the accumulated electrical-charge quantity of the pickup device(CCD is supposed here) at the shooter 60 not shown in figures. And FIG. 6 shows the operation of the shutter controller 71a.

Figure 6:
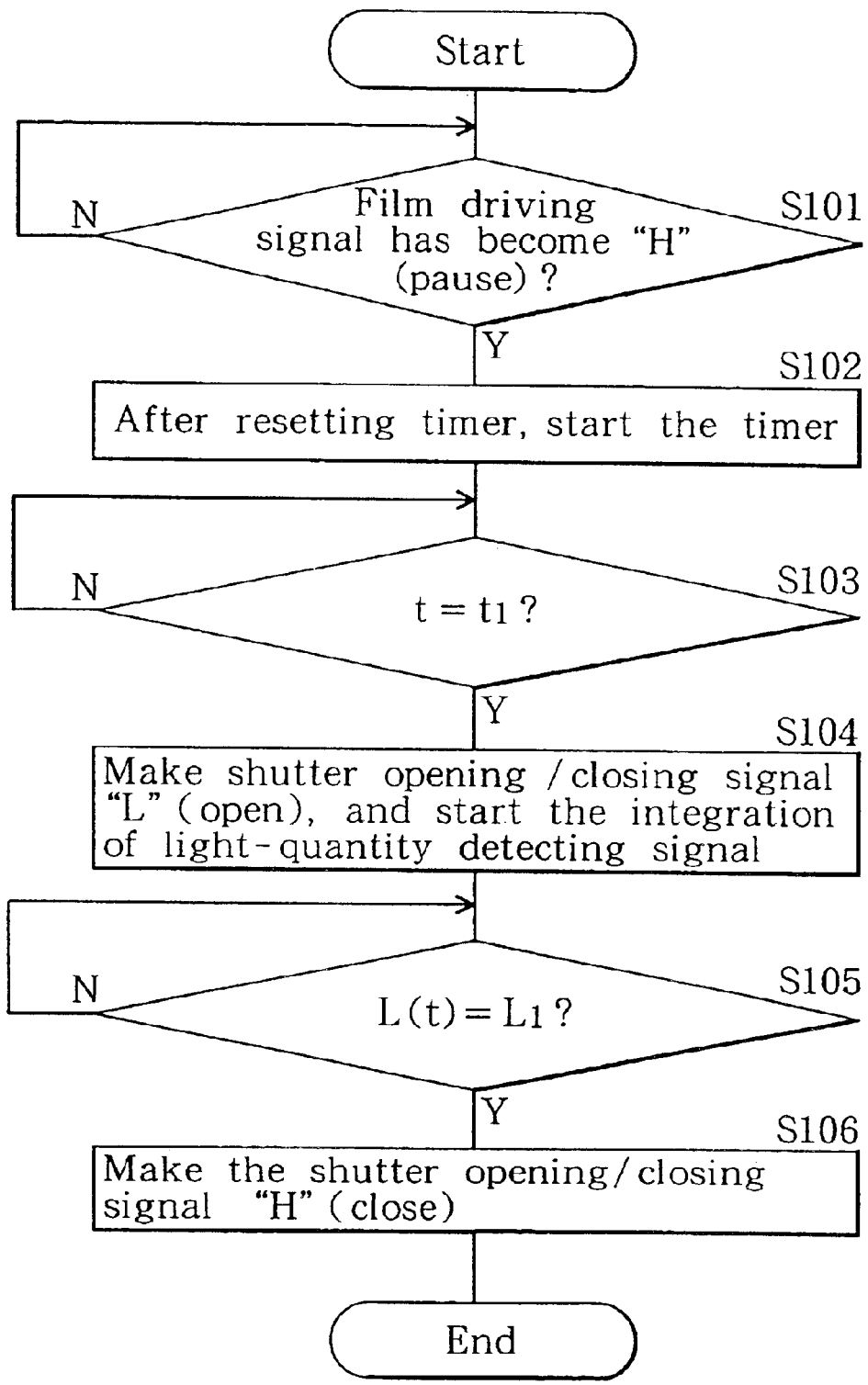
FIG. 6 is a flow chart showing the operation of the shutter controller shown in FIG. 4.

When the movie film 1 pauses by changing the film driving signal 74 from "L" level to "H" level (FIG. 6 step S101; Y), the shutter controller 71a resets a timer not shown in figures, and begins time-count operation (step S 102). When the time-count value reaches to a fixed value t1 shown in FIG. 5(b)(step S103; Y), the shutter controller 71a opens the shutter 73 of the shutter mechanism 70 by changing the shutter opening/closing signal 72 from "H" level to "L" level. At the same time, the controller 71a begins the integration of the light-quantity detecting signal 44, and computes the integral L(t) of light-quantity shown as the diagonally shaded area in (c) of FIG. 5(step S104). The integral L(t) of light-quantity corresponds to one example of the 'accumulated light-quantity' of the invention.

When the shutter 73 of the shutter mechanism 70 is opened, light from the light-emission lamp 41a is projected onto the image frame of the movie film 1, and the image is projected onto the CCD of the shooter 60. Hereby, the accumulation of charge corresponding to the projected image begins in the CCD of the shooter 60 (FIG. 5(d)).

When the integral L(t) of light-quantity obtained through the integration of the light-quantity detecting signal 44 reaches to the reference integral L1(step S 105; Y), the shutter controller 71a changes the shutter opening/closing signal 72 to "H" level, closing the shutter 73 of the shutter mechanism 70(step S 106). The shutter opening period differs depending on the level of the light-quantity detecting signal 44. In other words, when the level of the light-quantity detecting signal 44 is high, the shutter opening period t2 becomes shorter, while the level of the light-quantity detecting signal 44 is low, the shutter opening period t2' becomes longer.

When the shutter 73 of the shutter mechanism 70 is closed, the light from the light-emission lamp 41a is interrupted, and the charge accumulation in the CCD of the shooter 60 finishes. The charge accumulated in the CCD of the shooter 60 is read at the readout-timing in the following (FIG. 5(d)), and outputted as a video signal after passing several kinds of signal processing.

As described above, according to the image projection converting apparatus 10a of the embodiment, the integral L(t) light-quantity is controlled so as to be a constant value(reference integral L1) at all times through the opening/closing operation of the shutter 73 of the shutter mechanism 70. Therefore, the shutter opening period changes according to the light-emission quantity of the light-emission lamp 41a. Hereby, the accumulated exposure quantity(corresponds to one example of the 'accumulated projected light-quantity' of the invention) of the movie film 1 is regulated to be constant, regardless of the magnitude of the light-quantity of the light-emission lamp 41a. As a result, the charge-quantity accumulated in the CCD of the shooter 60 will not be effected by the light-quantity variation of the light-emission lamp 41a, and the accumulated charge-quantity of CCD becomes nearly constant(e1=e2 in FIG. 5(d)) at each frame, if the transmissivity of the movie film 1 is constant. Therefore, the video signal obtained through the shooter 60 hardly includes intensity variation(flicker) caused by light-quantity variation of the light-emission lamp 41a. Furthermore, the intensity level of the obtained video signal is maintained constant, even the light-quantity of the light-emission lamp 41a reduces through secular changes.

The third embodiment of the invention will now be described.

Image projection converting apparatus 10b as an image projecting apparatus of the embodiment is provided with shutter controller 71b in place of shutter controller 71a in FIG.4 concerned with the above-mentioned second embodiment. As will be described, the shutter controller 71b previously integrates the light-quantity detecting signal 44 from the photosensor 43 before opening the shutter 73 of the shutter mechanism 70, and changes the opening period of the shutter 73 of the shutter mechanism 70 according to the magnitude of the obtained integral L(t) of light-quantity. Other configurations are the same with FIG.4.

Figure 7:
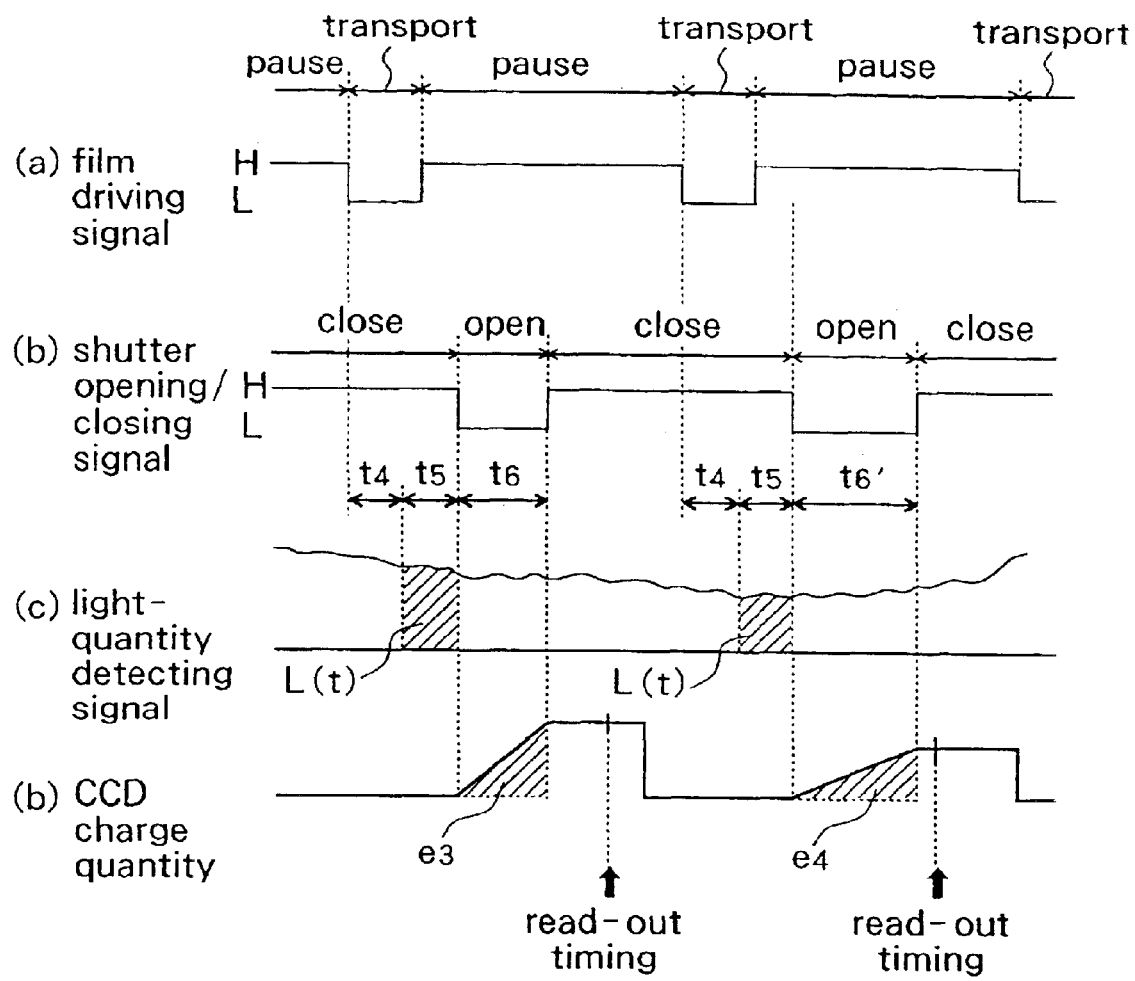
FIG. 7 is an illustration showing the operation timing of an image projection converting apparatus as an image projecting apparatus related to the third embodiment of the invention.

Next, the operation and the effect of the image projection converting apparatus 10b having such configuration, will now be described making reference to FIG. 7 and FIG. 8. FIG. 7 shows the operation timing of the image projection converting apparatus 10b, and (a)~(d) in the figure correspond to (a)~(d) in FIG. 5. And FIG.8 shows the operation of the shutter controller 71b.

Figure 8:
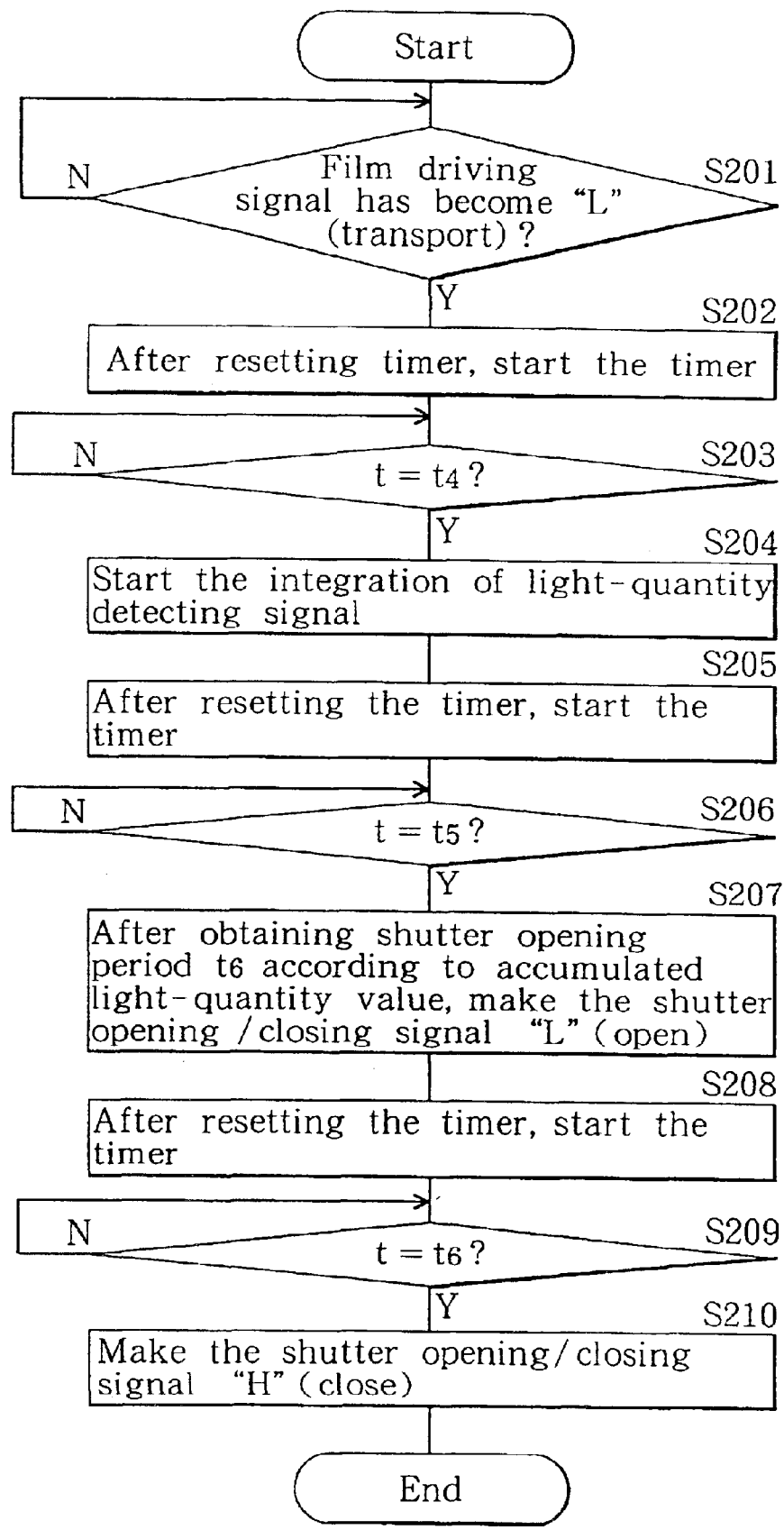
FIG. 8 is a flow chart showing the operation of shutter controller of the image projection converting apparatus as the image projecting apparatus related to the third embodiment of the invention.

When the movie film 1 starts running at the point of changing of the film driving signal 74 from "H" level to "L" level(FIG. 8 step S201; Y), the shutter controller 71b resets a timer not shown in figures, and begins time-count operation (step S202). The shutter controller 71b begins the integration of the light-quantity detecting signal 44(step S204), when the time-count value reaches to a fixed value t4 shown in FIG. 7(b) (step S203; Y). At the same time, the shutter controller 71b begins the time-count operation after resetting a timer not shown in figures(step S205).

The shutter controller 71b finishes the integration of the light-quantity detecting signal 44 to obtain the integral L(t) of light-quantity, when the time-count value reaches to a fixed value t5 shown in FIG. 7(b) (step S206; Y). The shutter controller 71b obtains shutter opening period t6 based on the integral L(t) of light-quantity, and opens the shutter 73 of the shutter mechanism 70 by changing the shutter opening/closing signal 72 from "H" level to "L" level(step S207). At the same time, the shutter controller 71b begins time-count operation after resetting a timer not shown in figures(step S208). The shutter opening period t6 corresponds to one example of the 'light-path opening period' of the invention, and the integral L(t) of light-quantity to one example of the 'accumulated light-quantity' of the invention.

The shutter opening period t6 is obtained by expression (2) below, using coefficient $\alpha(t)$ given by expression (1) below.

$$\alpha(t)=1+(L2-L(t))/L2 \quad (1)$$

$$t6=\tau \times \alpha(t) \quad (2)$$

L2 represents reference accumulated light-quantity, and τ represents reference shutter opening period corresponds to the reference accumulated light-quantity L2.

As is obvious from expression (1) and (2), the shutter opening period t6 changes according to the magnitude of the obtained integral L(t) of light-quantity. To be more specific, the shutter opening period t6 is shorter than τ when L2<L(t), and shutter opening period t6' is longer than τ when L2>L(t) as shown in FIG. 7(c).

When the shutter 73 of the shutter mechanism 70 is opened, light from the light-emission lamp 41a is projected onto the image frame of the movie film 1, projecting the image onto the CCD of the shooter 60. Hereby, the accumulation of the charge corresponding to the projected image starts in the CCD of the shooter 60 as shown in FIG. 7(d).

The shutter controller 71b closes the shutter 73 of the shutter mechanism 70 by changing the shutter opening/closing signal 72 to "H" level(step S210), when the time-count value of the timer reaches to the value t6, obtained at the step S207(step S209; Y).

When the shutter 73 of the shutter mechanism 70 is closed, light from the light-emission lamp 41a is interrupted, and the charge accumulation in the CCD of the shooter 60 finishes. The charge accumulated in the CCD of the shooter 60 is read at the readout-timing in the following (FIG. 7(d)), and recorded in such as video tape as a video signal after several kinds of signal processing.

In this way, according to the image projection converting apparatus 10b, the light-quantity detecting signal 44 is previously integrated for a given period obtaining the integral L(t) of light-quantity; before opening the shutter 73 of the shutter mechanism 70, and the opening period of the shutter 73 (i.e. light-path closing timing) is changed according to the magnitude of the integral L(t) of light-quantity. Hereby, the accumulated exposure quantity of the movie film 1 is regulated to be constant, regardless of the magnitude of the light-emission quantity of the light-emission lamp 41a. As a result, the charge-quantity accumulated in the CCD of the shooter 60 will not be effected by the light-quantity variation of the light-emission lamp 41a, and the accumulated charge-quantity becomes nearly constant (e3=e4 in FIG. 7(d)) if the transmissivity of the movie film 1 is constant. Therefore, the video signal obtained through the shooter 60 hardly includes intensity variation(flicker) caused by light-quantity variation of the light-emission lamp 41a. Furthermore, the intensity level of the obtained video signal is maintained constant, even the light-quantity of the light-emission lamp 41a reduces through secular changes.

Next, the fourth embodiment of the invention will now be described.

Figure 9:
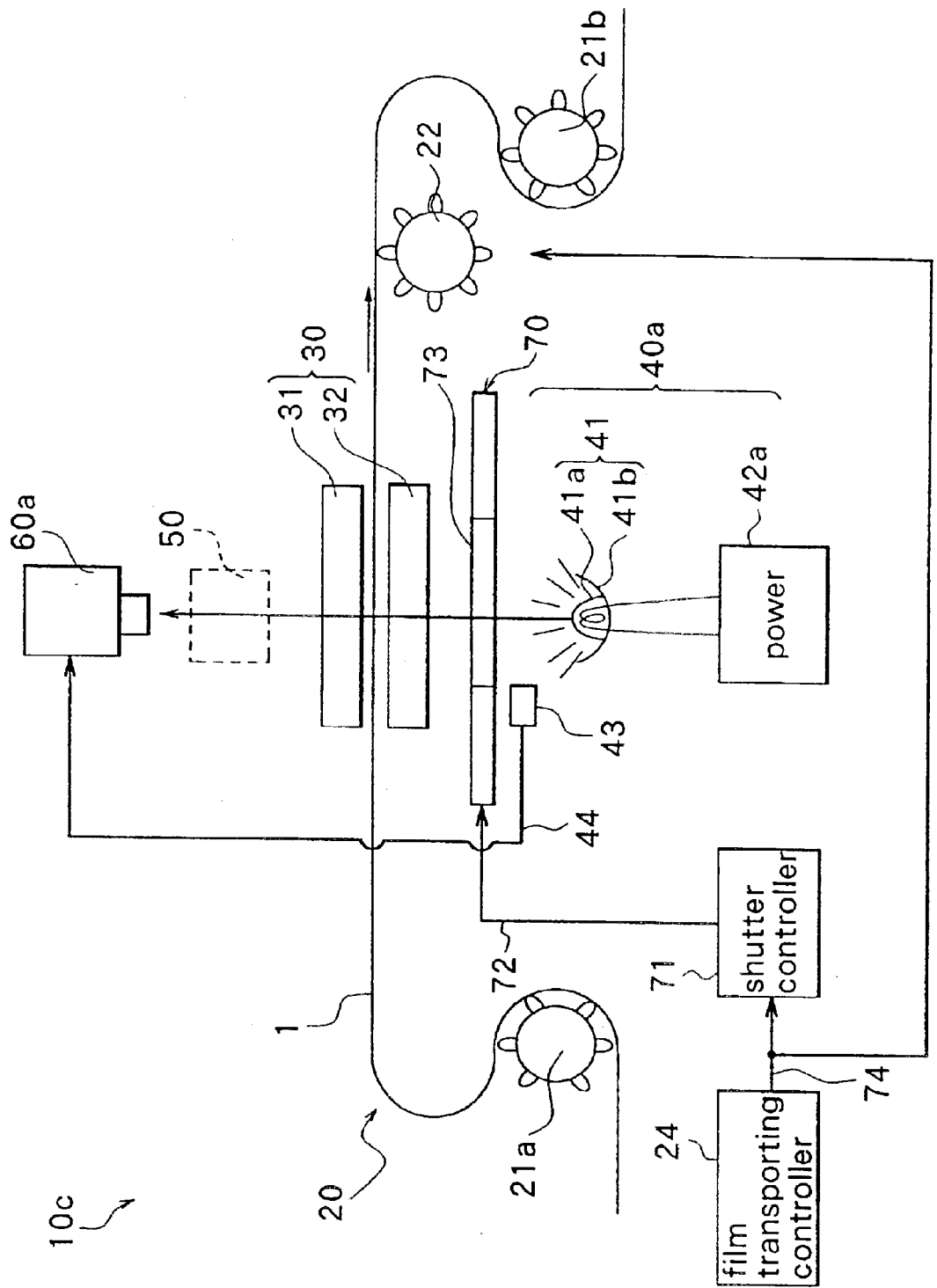
FIG. 9 is an illustration showing a diagrammatic configuration of an image projection converting apparatus as an image projecting apparatus related to the fourth embodiment of the invention.

FIG. 9 shows a diagrammatic configuration of an image projection converting apparatus as an image projecting apparatus related to the fourth embodiment of the invention. In the figure, the same marks as the one used in the above-mentioned first and second embodiments (FIG. 1, FIG. 4) represent the same configuration elements, and explanations will be omitted suitably.

According to image projection converting. apparatus 10c of the embodiment, shooter 60a is supplied with the light-quantity detecting signal 44 from the photosensor 43. The light-quantity regulator 46 in FIG. 1 is not provided, and a control terminal is not included in the power supply 42a. The shutter controller 71 each time performs frame-by-frame shutter control so that the opening period become constant, as is the same case with the above-mentioned first embodiment. The shooter 60a is provided with a gain control signal generator as will be seen, in the image projection converting apparatus 10c .

Figure 10:
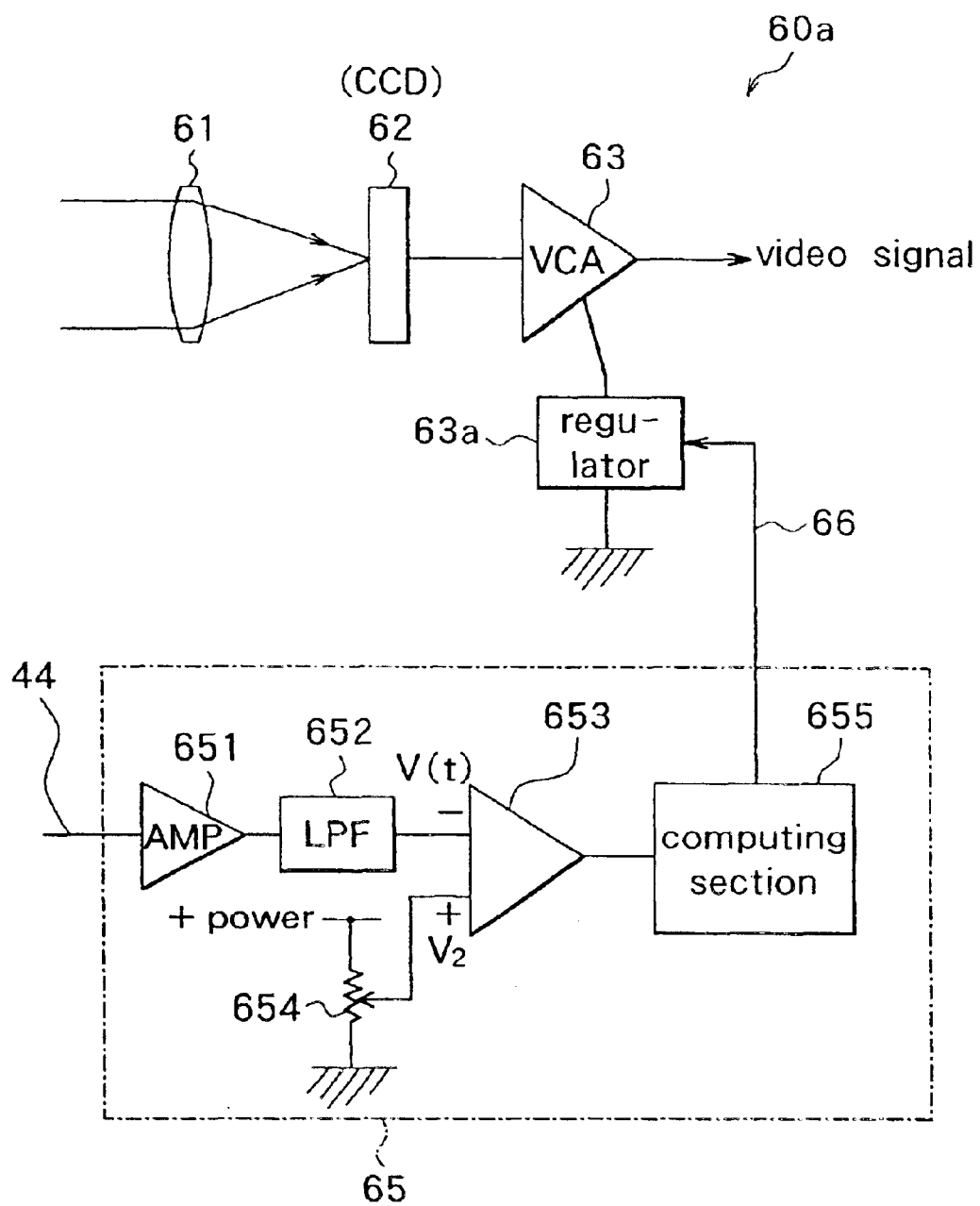
FIG. 10 is a block diagram showing a diagrammatic configuration of a shooter of the image projection converting apparatus shown in FIG. 9.

FIG. 10 shows the configuration of main sections of the shooter 60a. As is shown in the figure, the shooter 60a includes: image-pickup lens 61 for forming the image of the movie film 1 projected through the optical-axis correction/projection-lens section 50(FIG. 9); image-pickup device 62 consists of CCD, placed at the focus position of the image-pickup lens 61 so as to convert light-quantity of the incident light into a charge-signal and to accumulate it; voltage control amplifier(VCA)63 amplifying the pixel-signal read from the image-pickup device 62; and the gain control signal generator 65. In the voltage control amplifier 63, gain is variably controlled by gain control signal 66, inputted to regulator 63a from the gain control signal generator 65. The voltage control amplifier 63 and the gain control signal generator 65 corresponds to one example of the 'means for regulating intensity lever' of the invention.

The gain control signal generator 66 includes: amplifier (AMP) 651 to which the light-quantity detecting signal 44 from the photosensor 43 is inputted; low-pass filter(LPF)

652 connected to the output terminal of the amplifier 651 so as to cut a high frequency component and only let a low frequency component pass through; differential amplifier 653, the minus terminal of which is connected to the output terminal of the low-pass filter 652, while the plus terminal of which is connected to the movable terminal of the potentiometer 654, connected between the power supply voltage(+) and the ground; and computing section 655 connected to the output terminal of the differential amplifier 653.

The light-quantity detecting signal 44 inputted to the gain control signal generator 65 is amplified in the amplifier 651, smoothed in the low-pass filter 652 and inputted to the minus terminal of the differential amplifier 653 as detected light-quantity voltage V(t). On the other hand, reference light-quantity voltage V2 set up by the potentiometer 654 is inputted to the plus terminal of the differential amplifier 653. And the differential amplifier 653 outputs the difference between the reference light-quantity voltage V2 and the detected light-quantity voltage V(t), namely [V2−V(t)]. The V2 here is a selected fixed voltage value. For example, the computing section 655 computes coefficient β(t) shown in the next expression (3) based on the difference signal[V2−V(t)] outputted from the differential amplifier 653, and supplies the result to the regulator 63a of the voltage control amplifier 63 as the gain control signal 66.

$$\beta(t)=1+(V2-V(t))V2 \quad (3)$$

Other configurations are the same with the above-mentioned first embodiment.

Next, the operation and the effect of the image projection converting apparatus 10c having such configuration will now be described. The light-quantity detecting signal 44 outputted from the photosensor 43 is inputted to the gain control signal generator 65 of the shooter 60a. The gain control signal generator 65 amplifies the signal in the amplifier 651, smoothes the inputted light-quantity detecting signal 44 by cutting a high frequency component in the low-pass filter 652, and inputs the result to the minus terminal of the differential amplifier 653 as a detected light-quantity voltage V(t). The differential amplifier 653 takes the difference between the reference light-quantity voltage V2 and the detected light-quantity voltage V(t), namely [V2−V(t)], and supplies it to the computing section 655. The computing section 655 computes β(t) by the expression (3), and supplies the result to the regulator 63a of the voltage control amplifier 63 as the gain control signal 66. The regulator 63a regulates the gain of the voltage control amplifier 63 according to the value of the gain control signal 66. become more specific, when V2>V(t), the gain of the voltage control amplifier 63 is regulated so as to increase, as the value β(t) of the gain control signal 66 becomes larger than 1, while when V2<V(t), the gain of the voltage control amplifier 63 is controlled so as to decrease, as the value β(t) becomes smaller than 1.

By performing such control in a prescribed cycle(for example, a few milliseconds cycle), the intensity level of the video signal outputted from the voltage control amplifier 63 of the shooter 60 is regulated so as to. compensate the light-quantity variation of the light-emission lamp 41a. Hereby, an image obtained through the shooter 60a is not effected by the light-quantity variation of the light-emission lamp 41a, and hardly includes intensity variation.

According to the embodiment of the image projection converting apparatus 10c, the photosensor 43 detecting the light-emission quantity of the light-emission lamp 41a is provided, regulating the level of the video signal generated in the shooter 60a according to the light-quantity detecting signal 44 from the photosensor 43. Hereby the image obtained through the shooter 60 becomes an image with good quality with a little intensity variation, in spite of the intensity variation of the projected image caused by the light-quantity variation of the light-emission lamp 41a. Furthermore, the intensity level of the obtained video signal is maintained constant, regardless of the reduction of the light-quantity of the light-emission lamp 41a caused through secular changes.

Though a couple of embodiments were given to explain the invention so far, the invention may be embodied in various other ways not being. limited to these embodiments. For example, although an image projection converting apparatus. called telecinematography apparatus, performing electronization of a projected image by a pickup device is illustrated as an example in the above-mentioned embodiments, the luminous source apparatus of the invention is also available for example in a normal projector, performing image projection onto a screen, or in a liquid-crystal projector.

According to the image projecting apparatus of the invention, as described so far, the light-quantity emitted from the luminous body is detected and as the light-quantity emitted from the luminous body is regulated based on the result of the detection so as to make the projected light-quantity onto the recording medium constant. As a result, it becomes possible to suppress the harmful intensity variation of the image projected by the projected light, resulting in obtaining a projected image with stable image quality. Furthermore, the secular changes of the light-quantity of the luminous body will also be avoided.

According to another image projecting apparatus of the invention, the light-quantity emitted from the luminous body is detected, and as the accumulated projected light-quantity onto the recording medium is regulated to be constant by performing closing or opening the light-path from the luminous body to the recording medium. As a result, it becomes possible to avoid the intensity variation of the projected image caused by the light-quantity variation of the luminous body. Furthermore, the intensity level of the projected image will be maintained in a proper condition, regardless of the secular changes of the light-quantity of the luminous body.

According to the image projection converting apparatus of the invention, the light-quantity emitted from the luminous body is detected, and the intensity level of the image signal, obtained by the means for picking-up image which picks up the image projected by the light from the luminous body, is regulated based on the result of the detection. As a result, it becomes possible to avoid the intensity variation of the picked up image signal caused by the light-quantity variation of the luminous body. Furthermore, the intensity level of the picked-up image will be maintained in a proper condition regardless of the secular changes of the light-quantity of the luminous body.

Obviously any modifications and variations of the present invention are possible in the light of the above teachings. It is therefore to be understood that within the scope of the appended claims the invention may be practice otherwise than as specifically described.

What is claimed is:

1. An image projecting apparatus, performing image projection by projecting light onto a recording medium in which an image is recorded, comprising:

a luminous body emitting light to be projected onto the recording medium;

means for detecting the light-quantity emitted form the luminous body;

means for directly regulating the light-quantity emitted from the luminous body based on the result of detection by the means for detecting the light-quantity, so as to make the light-quantity emitted by the luminous body and therefore the light-quality projected onto the recording medium constant; and means for converting an image projected from the recording medium in accordance with the light-quantity projected onto the recording medium into a digital image, and for recording the digital image in digital recording means.

2. An image projecting apparatus according to claim 1 wherein the recording medium, in which an image is recorded, is a movie film.

3. An image projecting apparatus according to claim 1 wherein the recording medium, in which an image is recorded, is a group of liquid-crystal display devices.

4. An image projecting apparatus, performing image projection by projecting light onto a recording medium in which an image is recorded, comprising:

a luminous body emitting light to be projected onto the recording medium;

means for directly detecting the light-quantity emitted from the luminous body;

means for closing and opening the light-path from the luminous body to the recording medium;

means for controlling the opening/closing operation of the means for opening/closing light-path based on the result of the detection by the means for detecting the light-quantity in order to make the accumulated light-quantity projected onto the recording medium constant; and means for converting an image projected from the recording medium in accordance with the light-quantity projected onto the recording medium into a digital image, and for recording the digital image in digital recording means.

5. An image projecting apparatus according to claim 4 wherein the means for controlling opening/closing light-path begins the accumulation of the light-quantity detected by the means for detecting the light-quantity at the point of making the means for opening/closing light-path in opened state, and makes the means for opening/closing light-path in closed state at the point of the accumulated light-quantity has reached to prescribed value.

6. An image projecting apparatus according to claim 4 wherein the means for controlling opening/closing light-path accumulates the light-quantity detected by the means for detecting the light-quantity for a given period before making the means for opening/closing light-path in opened state, while obtaining the opening period of light-path of the means for opening/closing light-path based on the accumulated light-quantity, and makes the means for opening/closing light-path in opened state for the obtained opening period of light-path.

7. An image projecting apparatus according to claim 4 wherein the means for opening/closing light-path comprises a liquid-crystal shutter.

8. An image projecting apparatus according to claim 5 wherein the means for opening/closing light-path comprises a liquid-crystal shutter.

9. An image projecting apparatus according to claim 6 wherein the means for opening/closing light-path comprises a liquid-crystal shutter.

10. An image projecting apparatus according to claim 4 wherein the recording medium, in which an image is recorded, is a movie film.

11. An image projecting apparatus according to claim 5 wherein the recording medium, in which an image is recorded, is a movie film.

12. An image projecting apparatus according to claim 6 wherein the recording medium, in which an image is recorded, is a movie film.

13. An image projecting apparatus according to claim 4 wherein the recording medium, in which an image is recorded, is a group of liquid-crystal display devices.

14. An image projecting apparatus according to claim 5 wherein the recording medium, in which an image is recorded, is a group of liquid-crystal display devices.

15. An image projecting apparatus according to claim 6 wherein the recording medium, in which an image is recorded, is a group of liquid-crystal display devices.

16. An image projecting apparatus according to claim 4 wherein:

the recording medium, in which an image is recorded, is a movie film transported intermittently in one direction;

the means for opening/closing light-path is a liquid-crystal shutter; and the means for controlling opening/closing light-path controls the opening operation of the means for opening/closing light-path in synchronization with the intermittent transportation of a movie film, while controlling the closing operation of the means for opening/closing light-path based on the result of the detection by the means for detecting the light-, quantity in order to make the accumulated light-quantity projected onto the recording medium constant.

17. An image projection converting apparatus, performing image projection by projecting light onto a recording medium in which an image is recorded, comprising:

a luminous body emitting light to be projected onto the recording medium;

means for directly detecting the light-quantity emitted from the luminous body;

means for picking up an image projected from the recording medium in accordance with the light-quantity projected onto the recording medium means for regulating an intensity level of the picked up image based on the result of the detection of the means for detecting the light-quantity by directly regulating the light-quantity emitted from the luminous body; and whereby said means for picking up an image converts the picked up image into a digital image and records the digital image in digital recording means.

18. An image projection converting apparatus according to claim 17 wherein the recording medium, in which an image is recorded, is a movie film transported intermittently in one direction, comprising:

means for closing and opening the light-path from the luminous body to the recording medium; and means for controlling the opening/closing operation of the means for opening/closing light-path in synchronization with the intermittent transportation of the movie film.

* * * * *